United States Patent [19]
Baez Rios

[11] 3,945,289
[45] Mar. 23, 1976

[54] SAW TOOTH
[75] Inventor: Guillermo Baez Rios, Mexico City, Mexico
[73] Assignee: Emilio Retana Rodriguez, Mexico City, Mexico
[22] Filed: Apr. 14, 1975
[21] Appl. No.: 567,883

[52] U.S. Cl. .................. 83/853; 83/831; 83/839
[51] Int. Cl.² .................................... B23D 61/06
[58] Field of Search .......................... 83/830–834, 83/835–855

[56] References Cited
UNITED STATES PATENTS
334,303   1/1886   Swank .......................... 83/843 X Primary Examiner—J. M. Meister
Attorney, Agent, or Firm—Kinzer, Plyer, Dorn & McEachran

[57] ABSTRACT

A saw tooth of truncated rectangular pyramidal configuration, affixed at its smaller base to a saw body; the larger base, facing the work, is of concave configuration in the longitudinal direction, the direction of cutting movement; further, either the end surfaces of the tooth or the larger base surface of the tooth are concave in the transverse direction, affording four cutting points at the corners of the larger base.

9 Claims, 9 Drawing Figures

U.S. Patent   March 23, 1976   3,945,289
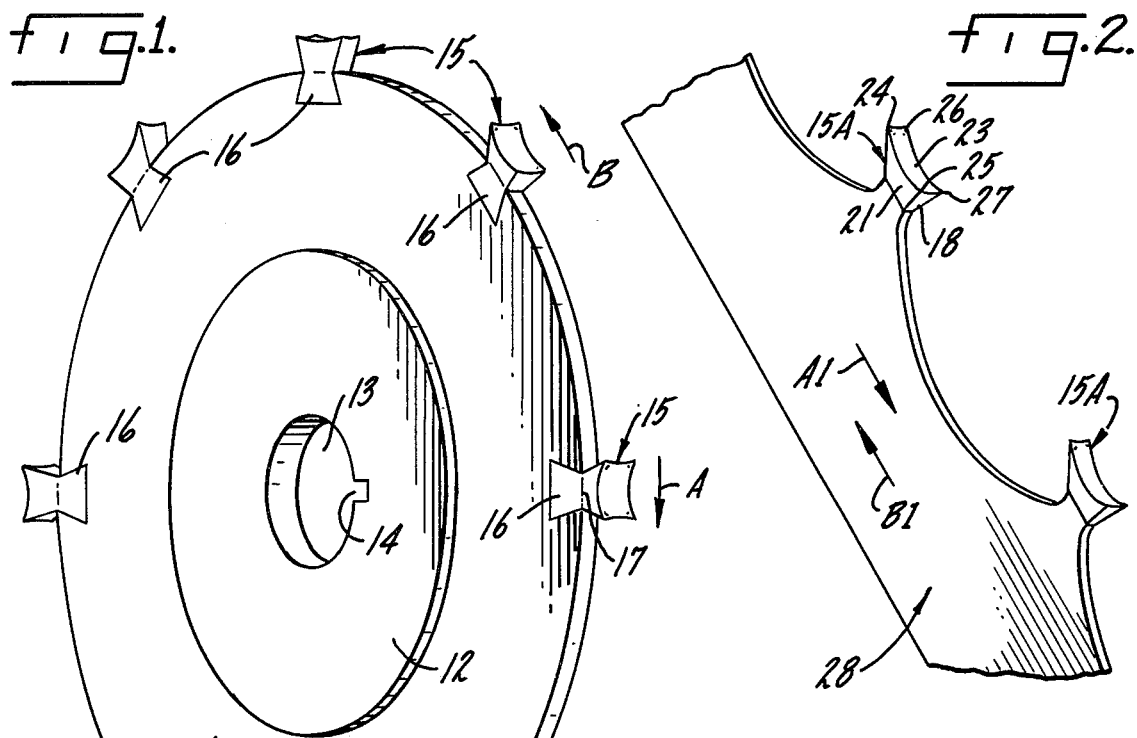
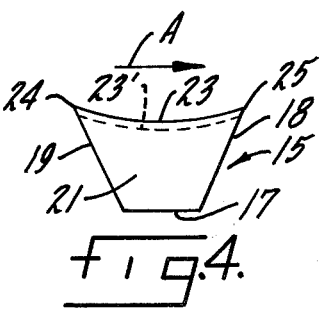
fig.4.
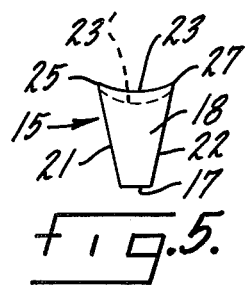
fig.5.
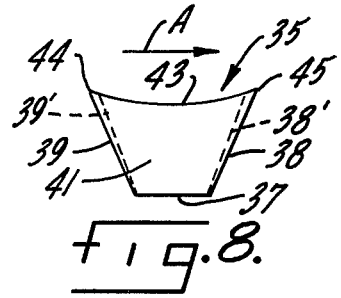
fig.8.
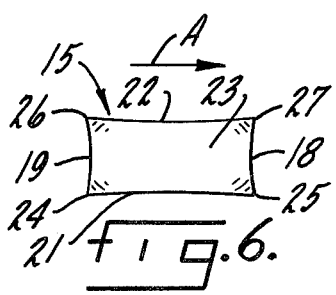
fig.6.
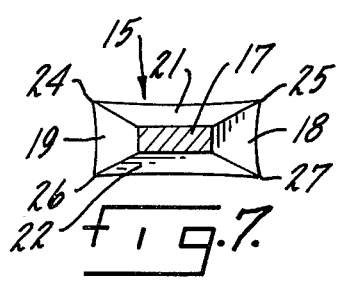
fig.7.
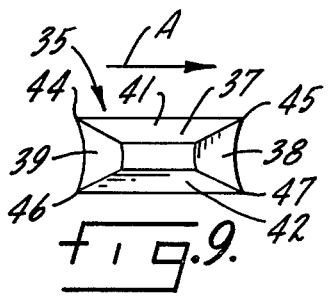
fig.9.

SAW TOOTH

BACKGROUND OF THE INVENTION

A wide variety of different forms of saws and similar cutting devices are generally known and used. Conventional manual saws, as used for cutting both wood and metal, have saw teeth inclined in one direction. In use, the saw moves reciprocally; movement in one direction constitutes a cutting stroke whereas movement in the opposite direction merely returns the saw blade to the beginning of another cutting stroke.

Saw teeth are often bent outwardly of the plane of the saw blade, alternately left and right, to produce a cut wider than the saw blade, so that the blade can slide through the cut easily without jamming. For carpentry and metal work, the saw usually has a single handle and is operated by one person; for felling trees larger two-handled saws are employed, worked by two people. In the latter, some of the teeth may be inclined in one direction and the balance inclined in the other so that a partial cutting action is achieved in each stroke of the saw.

Mechanically driven saws of various types operate on the same basic principles. Thus, the teeth of circular saws, including planing and smoothing saws, are usually all inclined in a single direction and the saw is consistently rotated in one direction. The same characteristics apply to chain saws, in which the saw teeth are mounted on an endless chain driven either by an electric motor or an internal combustion engine. For bench work, an endless band is often employed as the carrier of the saw teeth, with a unidirectional drive. It is also known to provide gang saws consisting of several parallel blades held in a single frame, with the blades actuated in a reciprocating movement to cut the material simultaneously in several locations. The variety of mechanically driven saws is almost endless, including saber saws, jig saws, and many other examples.

In any of these known saws and similar cutting devices, the saw teeth are subject to substantial wear. This is true even with respect to saws employed in cutting relatively soft woods, since the wood is at least somewhat abrasive and continuously erodes the saw teeth. In metal saws, harder metals are employed for the saw teeth, but the problem of wear is nevertheless present.

In virtually any conventional saw that is used regularly, the wear on the teeth necessitates periodic sharpening in order to maintain an efficient cutting operation. Saw sharpening requires specialized machinery and trained personnel; precision alignment and shaping of the teeth is essential to effective operation. Moreover, care must be exercised in grinding the saw teeth, in a sharpening operation, to avoid overheating of the teeth with consequent possible annealing and softening of the cutting elements of the saw.

One particular application in which the necessity for regular re-sharpening of a saw is highly disadvantageous is in the felling, cutting, and shaping of trees for railroad ties. This is particularly true in tropical and subtropical locations, where work conditions are quite difficult and skilled personnel are frequently unavailable. In applications of this kind, and especially where the trees are of hardwood varieties, the cost of saw maintenance may be an appreciable element of the overall cost of operation, and may be so high as to preclude economical use of available resources. Most conventional saws are inadequate and uneconomical, particularly for the cutting and shaping of tropical hardwoods, because the useful life of the saw is quite short and frequent re-sharpening and setting is necessary.

Another disadvantage of conventional saws is that the saw teeth have no point of support other than the actual cutting edges. This is particularly true with respect to planing saws, which often exhibit excessive vibration caused by the lack of support for the saw teeth, other than the cutting edges.

One saw construction in which these difficulties are partially alleviated is described in Topolinski U.S. Pat. No. 2,795,247, issued June 11, 1975. In the construction shown in the Topolinski patent, the saw teeth are inclined alternately in opposite directions, and alternate pairs of the saw teeth are bent outwardly of opposite sides of the saw blade. With this construction, the trailing teeth of each pair are partly self-sharpened as they ride through the cut made by the other teeth of the pair, and the saw can be reversed in direction to afford an extended period between re-sharpening operations. However, the use of the conventional laterally bent construction for the teeth to widen the saw cut limits the effectiveness of the self-sharpening operation and allows for undesirable vibration. Moreover, the individual teeth still have no support other than the actual cutting edge of the tooth itself.

Statement of the Invention

It is a primary object of the present invention, therefore, to provide a new and improved saw tooth construction that is inherently reversible and self-sharpening in operation and that affords a full-width cut with each individual tooth, so that the requirement for specialized personnel and machinery for sharpening is effectively eliminated.

A further object of the invention is to provide a new and improved reversible self-sharpening full-cut saw tooth in which the cutting elements of each tooth are effectively and closely supported by other elements of the same tooth to minimize vibration.

A specific object of the invention is to provide a new and improved reversible saw construction in which each tooth comprises four point cutting elements, two facing in one direction and two in the opposite direction, with two of the cutting elements being continuously sharpened while the other two are cutting and with all four cutting elements being continuously maintained as points.

Accordingly, the invention pertains to a reversible self-sharpening saw tooth of truncated rectangular pyramidal configuration, with the smaller base adapted to be mounted on a carrier and with the larger base facing outwardly of the carrier. The outwardly facing surface of the larger base of the saw tooth is of concave configuration in a longitudinal direction, corresponding to the direction of movement of the saw tooth in a cutting operation. Further, at least one surface of the saw tooth is of concave configuration in a transverse direction, so that the saw tooth affords four distinct cutting points located at the corners of the larger base, which four cutting points are maintained throughout substantial wear on the saw tooth. In one preferred construction, the surface having a concave configuration in the transverse direction is the outwardly facing surface of the larger base of the saw tooth. In another, the surfaces having a concave configuration in the transverse direction are the end surfaces of the saw tooth, intersecting the larger base surface at its opposite ends.

BRIEF DESCRIPTION OF THE DRAWINGS

FIG. 1 is a perspective view of a circular saw blade constructed in accordance with one embodiment of the invention and incorporating saw teeth constructed in accordance with one embodiment of the invention;

FIG. 2 is a fragmentary perspective view of a reciprocating saw blade incorporating teeth constructed in accordance with the present invention;

FIG. 3 is a fragmentary perspective view of a chain saw cutting element including a saw tooth constructed in accordance with the present invention;

FIG. 4 is a side elevation view of a saw tooth utilizing the construction illustrated in FIGS. 1–3;

FIG. 5 is an end elevation view of the saw tooth of FIG. 4;

FIG. 6 is a plan view of the saw tooth of FIG. 4;

FIG. 7 is a bottom view of the saw tooth of FIG. 4;

FIG. 8 is a side elevation view, similar to FIG. 4, of a saw tooth constructed in accordance with another embodiment of the invention; and FIG. 9 is a bottom view of the saw tooth of FIG. 8.

DESCRIPTION OF THE PREFERRED EMBODIMENTS

Fig. 1 illustrates a circular saw 10 constructed in accordance with one preferred embodiment of the invention. Saw 10 comprises a circular carrier disc or blade 11 having a central hub 12 in which a mounting aperture 13 is formed. Hub 12 may include a keyway 14 or other appropriate means for affixing saw 10 to a drive shaft for rotation of the saw.

A plurality of saw teeth 15 are mounted around the rim of the carrier disc 11 of saw 10. The inner part of each saw tooth 15 comprises a wedge-shaped segment 16 that is press fit or otherwise securely mounted in the rim of the saw blade. The particular mounting technique used and the configuration of mounting segment 16 are not critical to the present invention and any appropriate means may be adopted for this purpose.

The present invention is particularly directed to the configuration and construction of the outwardly projecting working portions of each of the saw teeth 15. As best shown in FIGS. 4–7, each saw tooth 15 is of truncated rectangular pyramidal configuration. The saw tooth has a smaller base 17 from which two end surfaces 18 and 19 and two side surfaces 21 and 22 project. The end surfaces 18 and 19 are inclined away from each other and the side surfaces 21 and 22 are also inclined away from each other, all of these surfaces terminating at the edges of the larger base surface 23.

The outwardly-facing larger base surface 23 of each saw tooth 15 is of concave configuration in a longitudinal direction, this direction being the direction of movement of the saw tooth in the course of cutting operation. This longitudinal direction is the direction indicated by the arrows A (clockwise rotation) and B (counterclockwise rotation) in FIG. 1.

The outwardly facing larger base surface 23 of each saw tooth 15 is also of concave configuration in a transverse direction, normal to arrows A and B. This additional concavity is specifically indicated by dash line 23' in FIGS. 4 and 5. Thus, each saw tooth 15 affords four distinct cutting points 24, 25, 26 and 27 (FIGS. 1 and 4–7) located at the corners of the larger base surface 23 of the rectangular pyramid.

In considering the operation of the circular saw 10 and its teeth 15, it may first be assumed that the saw is rotating clockwise, in the direction of the arrow A. For this mode of operation, the cutting of the wood, metal, or other material is accomplished by the two cutting points 25 and 27 at what presently constitutes the leading end or edge 18 of each saw tooth. The points 24 and 26 at the trailing end or edge 19 of each tooth ride on the surface cut by the point cutting elements 25 and 27. Thus, elements 24 and 26 afford a support for saw tooth 15. This support action effectively limits the depth of the saw cut and materially reduces vibration of the saw, particularly because points 24 and 26 are integral with and closely spaced with respect to the cutting points 25 and 27.

With continued operation of saw 10, in the direction of arrow A, the cutting points 25 and 27 are subjected to some wear; ultimately, the points become somewhat blunted and cutting efficiency is reduced. When this occurs, it is a relatively simple matter to remove saw 10 from its drive shaft (not shown) and reverse the mounting of blade 11 on the shaft so that the saw is now driven in the direction of arrow B. When this has been done, points 24 and 26 become the leading points on each of the saw teeth and function as the cutting elements of the saw. With the reversal of movement, points 25 and 27 are located at the trailing end of the saw tooth and ride in the saw cut, performing the support, stabilization, and cut-limiting functions previously carried out by points 24 and 26. In addition, the abrading action to which points 25 and 27 are now subjected, as they ride along the surface of the saw cut, wears away the inside portions of the surface 23 adjacent the points 25 and 27. Because surface 23 is of concave configuration in both the longitudinal and transverse directions, this abrasive action sharpens points 25 and 27 and prepares them for subsequent cutting operations.

Thereafter, when points 24 and 26 have worn down to an extent sufficient to reduce the cutting efficiency of the saw 10, the saw is again reversed and returned to operation moving in the direction of arrow A. With this reversal points 25 and 27, having been sharpened during the prior operation in the direction of arrow B, become the cutting points. Points 24 and 26 are now the trailing points, and are sharpened in the course of subsequent cutting operations.

From the foregoing structural and operational description of the circular saw 10 and its teeth 15, it will be apparent that each saw tooth 15 is inherently self-sharpening. The support afforded the cutting elements of each saw tooth minimizes vibration of the saw in the course of its operation, stabilizing and supporting each saw tooth from its own trailing edge. The point cutting elements of each saw tooth are inherently more efficient than conventional cutting edges. The usual requirement for alternate deflection of the saw teeth to provide a kerf or cut wider than the body of the saw blade is eliminated, due to the basic pyramidal shape of each tooth, so that resetting of the saw teeth is eliminated along with any necessity for separate sharpening operations.

In many applications, particularly in cutting hard woods or in saws intended for the cutting of metals, the selection of the material used in forming the saw teeth 15 may become rather important. Indeed, even in saws intended for use with soft woods the saw tooth material should be selected so that the heat to which the teeth are subjected, particularly as a result of the abrading or self-sharpening action on the trailing cutting points, will not soften the teeth and thereby render them subject to deformation or excessive wear. To this end, each of the saw teeth 15 should preferably be formed from a high temperature alloy, one capable of withstanding temperatures up to 500°F. without marked change in operating characteristics. Moreover, the metal from which the saw teeth 15 are formed should preferably be one which exhibits significant work-hardening properties, so that the cutting points 24-27 will become even harder and more efficient in their cutting operation with continued use of the saw. Some of the alloys that have been developed for turbine blades and like applications can be used. The "Stellite" alloys of Haynes Stellite Co., as described in "Handbook of Material Trade Names," Industrial Research Service, Dover, New Hampshire, 1953 Ed. p. 538, are generally suitable. These alloys contain 40–80% cobalt, 20–35% chromium, 0–25% tungsten, 0.75–2.5% carbon, and 0–3% silicon. One alloy that has been effectively employed for the saw teeth 15, "Stellite 12," has the following constituency:

| Nickel | 3% max. | Chromium | 28–32% |
| Silicon | 1% | Tungsten | 7–9.5% |
| Iron | 3% | Carbon | 1.1–1.7% |
| Manganese | 1% | Cobalt | Balance |

However, other high temperature alloys can also be successfully employed, though relatively brittle materials (e.g. tungsten carbide) are not particularly desirable.

FIG. 2 illustrates a linear saw blade 28 and may be considered to represent a segment of the blade of a manual saw, a saber saw, or a band saw. A series of saw teeth 15A are affixed to the carrier or saw blade 28 at spaced intervals. In this instance the saw teeth 15A are welded, brazed, or otherwise fixedly mounted on one edge of the saw blade, a portion of that edge of the saw blade being relieved between teeth for cleaner, smoother operation of the saw. The saw teeth 15A are of the same configuration and afford the same self-sharpening and vibration-stabilizing operation as the teeth of the circular saw 10 described above.

As a segment of a manual saw or a saber saw blade, member 28A would be actuated in a reciprocating motion, alternately in the directions of the arrows A1 and B1, so that the cutting points 24 and 26 would be sharpened on one stroke of the saw (arrow A1) and the other two cutting points 25 and 27 would be sharpened on the next stroke of the saw (arrow B1). In a band saw construction, of course, the band would be reversed periodically to utilize the self-sharpening benefits of the saw teeth as described above with respect to circular saw 10.

FIG. 3 illustrates one linkage 29 from a chain saw equipped with saw teeth 15B. Each saw tooth 15B along the chain is of similar configuration; only one has been shown. Further, the construction and configuration of each saw tooth 15B is essentially similar to the saw teeth 15 described in detail above, affording a complete self-sharpening, self-supporting reversible operation corresponding to that of circular saw 10.

FIGS. 8 and 9 illustrate a saw tooth 35 that is somewhat different from saw tooth 15 but that affords the same basic operating characteristics and advantages and hence constitutes another preferred embodiment of the invention. As before, the saw tooth 35 is of truncated rectangular pyramidal configuration having a smaller base 37 joined to a larger base 43 by end surfaces 38 and 39 and side surfaces 41 and 42. The end and side surfaces all slope outwardly away from the smaller base 37 so that the outer base 43 is larger in all dimensions than base 37. As before, the larger base surface 43 of tooth 35 is of concave configuration in a longitudinal direction (arrow A). However, in this tooth the larger base need not be formed with a concave configuration in a transverse direction. Instead, each of the side surfaces 38 and 39 is formed to be of concave configuration in the transverse direction, as particularly indicated by the dash lines 38' and 39' in FIG. 8. As a consequence, saw tooth 35 affords four distinct cutting points 44–47.

When tooth 35 is subjected to wear in ordinary operation, the trailing edge cutting points (points 44 and 46 for operation in direction A) are effectively sharpened. Consequently, when the direction of cutting movement is reversed, these cutting points are fully effective without requiring dismounting of the saw for grinding or other sharpening and setting procedures. Furthermore, as in the case of tooth 15, tooth 35 provides a support at the trailing edge of the tooth that limits the depth of cut and that effectively minimizes or eliminates vibration that would otherwise be present in operation of a saw incorporating the tooth. Concave surfaces in both the vertical and horizontal surfaces of the tooth, combining the features of teeth 15 and 35, may also be employed.

In forming the saw teeth 15 or 35 of the invention, it is preferable that the end edges of the greater base of each tooth, which are symmetrical, be separated from the center line of the tooth by a distance of at least six times the overall kerf of the tooth. Further, the dimensions os the tooth should be coordinated to the tangential velocity of the saw and the anticipated depth of cut, in accordance with known principles.

In operation, saws constructed in accordance with the present invention substantially reduce lost time which would otherwise be necessary for sharpening and setting of the saws. Indeed, the expense and difficulty of sharpening and setting operations are almost entirely eliminated. A circular saw of the general kind illustrated in FIG. 1 has been employed for continuous operation in the cutting of tropical hardwoods for railroad ties for a period of several months, in contrast with conventional saws that require resharpening and resetting virtually on a daily basis. At the same time, vibration is materially reduced because of the self-supporting characteristics of the saw teeth of the present invention, and this reduction in vibration is also beneficial in minimizing wear on the saw teeth.

I claim

1. A reversible self-sharpening saw tooth of truncated rectangular pyramidal configuration, with the smaller base adapted to be mounted on a carrier with the larger base facing outwardly of the carrier, the outwardly facing surface of the larger base of the saw tooth being of concave configuration in a longitudinal direction corresponding to the direction of movement of the saw tooth in a cutting operation, and at least one surface of the saw tooth being of concave configuration in a transverse direction so that the saw tooth affords four distinct cutting points located at the corners of the larger base, which four cutting points are maintained throughout substantial wear on the saw tooth.

2. A saw tooth according to claim 1 in which the surface having a concave configuration in the transverse direction is the outwardly facing surface of the larger base of the saw tooth.

3. A saw tooth according to claim 1 in which the surfaces having a concave configuration in the transverse direction are the end surfaces of the saw tooth, intersecting the larger base surface at its opposite ends.

4. A saw tooth according to claim 1 in which the tooth is formed of a high temperature alloy having significant work-hardening properties.

5. A saw tooth according to claim 4 in which the approximate constituency of the alloy is:

| | |
|---|---|
| Cobalt | 40–80% |
| chromium | 20–35% |
| tungsten | 0–25% |
| carbon | 0.75–2.5% |
| silicon | 0–3% |

6. A saw tooth according to claim 4 in which the approximate constituency of the alloy is:

| | |
|---|---|
| nickel | 3% maximum |
| silicon | 1% |
| iron | 3% |
| manganese | 1% |
| chromium | 28–32% |
| tungsten | 7–9.5% |
| carbon | 1.1–1.7% |
| cobalt | balance. |

7. A reversible self-sharpening saw comprising:
a carrier having a plurality of saw teeth mounted thereon,
each saw tooth being of truncated rectangular pyramidal configuration with the smaller base affixed to the carrier and the larger base facing outwardly of the carrier,
the outwardly facing surface of the larger base of each saw tooth being of concave configuration in a longitudinal direction corresponding to the direction of movement of the carrier in a cutting operation,
and at least one surface of each saw tooth being of concave configuration in a transverse direction so that the saw tooth affords four distinct cutting points located at the corners of the larger base, which four cutting points are maintained throughout substantial wear on the saw tooth.

8. A saw according to claim 7 in which the surface of each saw tooth having a concave configuration in the transverse direction is the outwardly facing surface of the larger base of the saw tooth.

9. A saw according to claim 7 in which the surfaces of each saw tooth having a concave configuration in the transverse direction are the end surfaces of the saw tooth, intersecting the larger base surface at its opposite ends.

* * * * *